(12) United States Patent
Deng et al.

(10) Patent No.: US 9,146,710 B2
(45) Date of Patent: *Sep. 29, 2015

(54) COMMUNICATION VIRTUAL MACHINE

(71) Applicants: Yi Deng, Miramar, FL (US); S. Masoud Sadjadi, Miami, FL (US); Steve Luis, Pembroke Pines, FL (US); Peter Clarke, Miami, FL (US); Chi Zhang, Sunnyvale, CA (US); Evangelos Christidis, North Bay Village, FL (US); Raju Rangaswami, Miami Beach, FL (US)

(72) Inventors: Yi Deng, Miramar, FL (US); S. Masoud Sadjadi, Miami, FL (US); Steve Luis, Pembroke Pines, FL (US); Peter Clarke, Miami, FL (US); Chi Zhang, Sunnyvale, CA (US); Evangelos Christidis, North Bay Village, FL (US); Raju Rangaswami, Miami Beach, FL (US)

(73) Assignee: THE FLORIDA INTERNATIONAL UNIVERSITY BOARD OF TRUSTEES, Miami, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 14/070,884

(22) Filed: Nov. 4, 2013

(65) Prior Publication Data
US 2014/0059515 A1 Feb. 27, 2014

Related U.S. Application Data

(63) Continuation of application No. 12/443,790, filed as application No. PCT/US2007/080327 on Oct. 3, 2007, now Pat. No. 8,578,325.

(60) Provisional application No. 60/849,287, filed on Oct. 4, 2006.

(51) Int. Cl.
G06F 9/44 (2006.01)
H04L 29/08 (2006.01)

(52) U.S. Cl.
CPC .... *G06F 8/20* (2013.01); *H04L 67/14* (2013.01); *H04L 67/141* (2013.01)

(58) Field of Classification Search
CPC ............. G06F 8/20; G06F 8/10; G06F 8/35; G06F 8/24; H04L 67/14
USPC .................................. 717/104, 151
See application file for complete search history.

(56) References Cited

U.S. PATENT DOCUMENTS

| | | | |
|---|---|---|---|
| 5,247,651 A | 9/1993 | Clarisse | |
| 5,870,588 A | 2/1999 | Rompaey et al. | |
| 7,321,382 B2* | 1/2008 | Okajima et al. | 348/14.01 |
| 2003/0041180 A1* | 2/2003 | Schlussman | 709/328 |
| 2005/0114829 A1 | 5/2005 | Robin et al. | |
| 2005/0246712 A1* | 11/2005 | Ferris | 719/310 |
| 2006/0059253 A1 | 3/2006 | Goodman et al. | |
| 2006/0090157 A1* | 4/2006 | Park et al. | 717/140 |
| 2008/0086564 A1* | 4/2008 | Putman et al. | 709/227 |

OTHER PUBLICATIONS

International Search Report for PCT/US2007/080327, mailed Mar. 11, 2008.

(Continued)

*Primary Examiner* — Ryan Coyer
*Assistant Examiner* — Hui-Wen Lin
(74) *Attorney, Agent, or Firm* — Marshall, Gerstein & Borun LLP

(57) ABSTRACT

A system for automating at least a portion of a communication application development cycle using a communication virtual machine that automatically interfaces with an existing network system and provides an engine for executing designed application models over the existing network system.

11 Claims, 7 Drawing Sheets

(56) References Cited

OTHER PUBLICATIONS

Yi Deng et al. "A Unified Architectural Model for On-Demand User-Centric Communications" Technical Report: FIU-SCIS-2005-09 (Sep. 2005, pp. 1-13) School of Computing and Information Sciences, Florida International University.

Jason C. Hung et al. "An Efficient Approach to Holding a Virtual Conference" Proc. Natl. Sci. Counc. ROC(A) vol. 25, No. 6, 2001. pp. 352-366.

Yali Wu, Andrew A. Allen, Frank Hernandez, Robert B. France, and Peter J. Clarke. Journal of Software Practice and Experience (SP&E). *A Domain-Specific Modeling Approach to Realizing User-Centric Communication.* Mar. 2012, 42(3) pp. 357-390. doi: 10.1002/spe.1081.

Lennox et al., *Call Processing Language (CPL): A Language for User Control of Internet Telephony Services*, Columbia University, Oct. 2004 (accessed Mar. 20, 2015, at http://www.hjp.at/doc/rfc/rfc3880.html).

Peter J. Clarke, Vagelis Hristidis, Yingbo Wang, Nagarajan Prabakar and Yi Deng. A Declarative Approach for Specifying User-Centric Communication. *Proceeding of the International Symposium on Collaborative Technologies and Systems (CTS 2006)*, May 2006 pp. 89-98.

\* cited by examiner

COMMUNICATION VIRTUAL MACHINE

RELATED APPLICATIONS

This application is a continuation of, and claims the benefit of priority of, U.S. patent application Ser. No. 12/443,790, filed Mar. 12, 2010, and of U.S. Provisional Patent Application No. 60/849,287, filed on Oct. 4, 2006, both of which are titled "Communication Virtual Machine." The entire disclosure of each is hereby incorporated by reference herein for all purposes.

STATEMENT REGARDING FEDERALLY SPONSORED RESEARCH OR DEVELOPMENT

This invention was made with government support under grant HRD-0317692, awarded by the National Science Foundation. The government has certain rights in the invention.

FIELD OF INVENTION

The present invention generally relates to a process for constructing digital communication systems.

BACKGROUND

Existing digital communication applications are designed by first determining a media format, e.g. instant messaging or video conferencing, and subsequently, developing and testing a platform for deployment and support of the media format. The platform, which may include individual systems, technology, and tools, may then be gradually modified to support more sophisticated communication functions. These existing communication applications are developed in a stovepipe fashion with limited separation between application needs and logic, or between device types and underlying networks. Existing systems may hinder the development of new communication applications, particularly domain specific applications, such as telemedicine, because of the complexity, cost, and lengthy cycle required of vertical development.

Moreover, such vertically developed systems typically have fixed functionality and limited interfaces, and contain components that do not interoperate with each other (e.g., because the components have differences in design, architecture, API, and network/device assumptions). This lack of interoperability may make it difficult to modify existing systems to fit changing user needs, to fit dynamics of underlying networks, and to adapt to new device and network technologies. As a consequence, users, particularly sophisticated domain specific users, are forced to use multiple tools to satisfy their communication needs.

SUMMARY OF THE INVENTION

For a given communication application need, a model that describes the requirements and logic of the type of communication may be created. This model may be called a communication schema. When a user desires to initiate a session of communication, the schema will be loaded into a communication virtual machine (CVM) system, which synthesizes the schema into a communication script which can be executed by the CVM to start communication with another device, e.g., a computer and/or a personal data assistant (PDA). This synthesis process may also establish the connection with other participants of the communication session, and may be totally automated.

The script may be executed by the CVM, which works with the underlying communication network and devices to support the communication between the participants. The schema can be changed at runtime to adapt to the changing needs of the communication, e.g. switch from voice conference to video conference, or to exchange a new type of data.

DRAWINGS

DETAILED DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
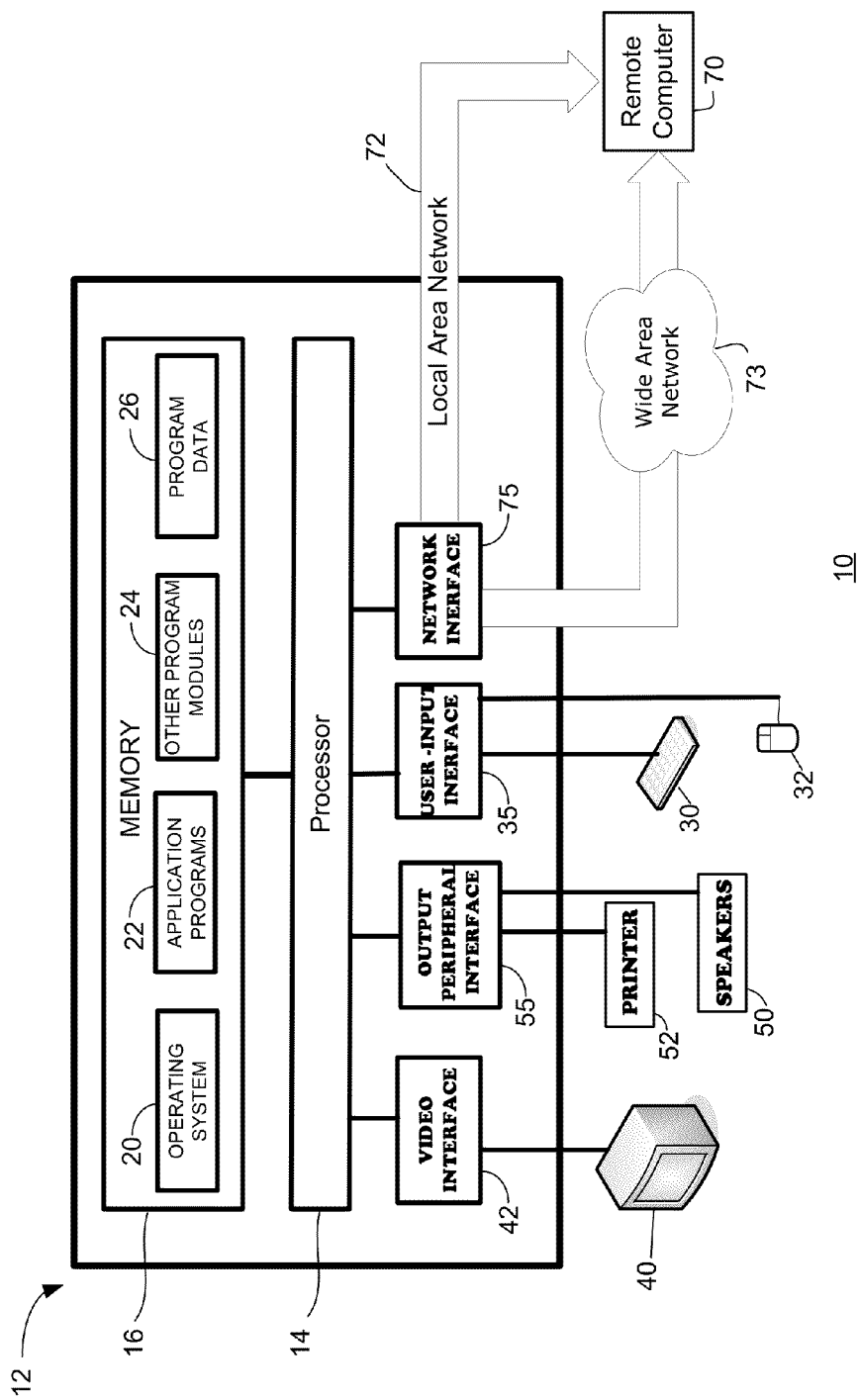
FIG. 1 illustrates a block diagram of a computing system that may operate in accordance with the claims.

FIG. 1 illustrates an example of a suitable computing system environment 10 on which a system for the features of the claimed method and apparatus may be implemented. The computing system environment 10 is only one example of a suitable computing environment and is not intended to suggest any limitation as to the scope of use or functionality of the method and apparatus of the claims. Neither should the computing environment 10 be interpreted as having any dependency or requirement relating to any one component or combination of components illustrated in the exemplary operating environment 10.

The features of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, mobile devices, wireless systems, internet systems, educational systems, health systems, administrative systems, financial systems, business systems, marketing systems, e-commerce systems, monitoring systems, diagnostic systems, management systems, transportation systems, ticketing systems, purchasing systems, gaming systems, entertainment systems, broadcast systems, distribution systems, distributed computing environments that include any of the above systems or devices, and the like.

The features of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

The exemplary embodiment of FIG. 1 includes a general purpose computing device in the form of a computer 12. Components of computer 12 may include, but are not limited to, a processing unit 14 and a memory 16. Memory 16 may include a variety of computer readable media that may be accessed by computer 12 and includes both volatile and nonvolatile media, removable and non-removable media. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may accessed by computer 12. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The memory 16 may include computer storage media in the form of volatile and/or nonvolatile memory such as read only memory (ROM) and random access memory (RAM). By way of example, and not limitation, FIG. 1 illustrates that memory 16 may include an operating system 20, application programs 22, other program modules 24, and program data 26.

A user may enter commands and information into the computer 12 through input devices such as a keyboard 30 and pointing device 32, commonly referred to as a mouse, trackball or touch pad. Other input devices (not illustrated) may include a microphone, joystick, game pad, satellite dish, scanner, or the like. These and other input devices are often connected to the processing unit 14 through a user input interface 35, but may be connected by other interface and bus structures, such as a parallel port, game port or a universal serial bus (USB). A monitor 40 or other type of display device is also connected to the CPU via an interface, such as a video interface 42. In addition to the monitor, computers may also include other peripheral output devices such as speakers 50 and printer 52, which may be connected through an output peripheral interface 55.

The computer 12 may operate in a networked environment using logical connections to one or more remote computers, such as a remote computer 70. The remote computer 70 may be a personal computer, a server, a router, a network PC, a peer device or other common network node, and typically includes many or all of the elements described above relative to the computer 12. The logical connections depicted in FIG. 1 include a local area network (LAN) 72 and a wide area network (WAN) 73, but may also include other networks. Such networking environments are commonplace in offices, enterprise-wide computer networks, intranets and the Internet.

When used in a LAN or WAN networking environment, the computer 12 may be connected to the LAN 72 or WAN 73 through a network interface or adapter 75. The network interface may be a modem, an Ethernet card, token ring adapter, and other means for establishing communications over a network. Alternatively, instead of the network interface 75, a modem to the WAN 73 may be connected to the computer 12 via the user input interface 35, or other appropriate mechanism. In a networked environment, program modules depicted relative to the computer 12, or portions thereof, may be stored in the remote memory storage device. It will be appreciated that the network connections illustrated are exemplary and other means of establishing a communications link between the computers may be used.

Figure 2:
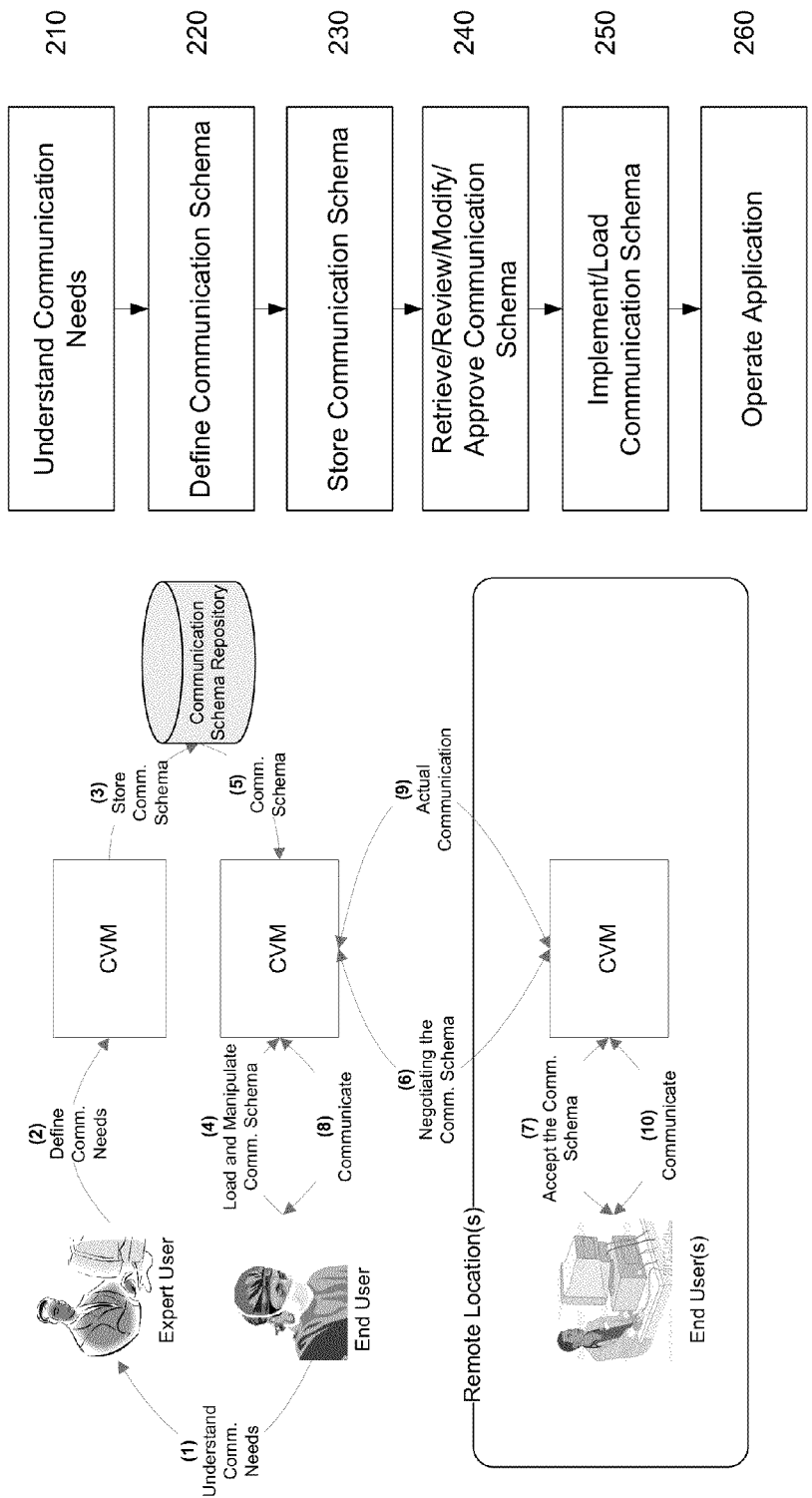
FIG. 2 illustrates a general process embodiment of the digital communication development system.

FIG. 2 illustrates a general process embodiment of the digital communication development system, or communication virtual machine (CVM) system. Generally, the CVM system provides a model-driven process for conceiving, structuring, synthesizing and delivering communications that are tailor-made for user or application needs. As illustrated in FIG. 1, a domain expert first elicits communication needs 210. Next the expert creates a communication model called a communication schema that encapsulates the application needs 220. The communication schema may then be stored in a repository or database 230. Before the implementation of the schema, an end user may review the schema by retrieving it from the repository and may further modify the communication schema to satisfy his/her needs 240. The communication schema may be negotiated with remote users (e.g., remote users may also be able to retrieve and modify the schema) to fit their needs as well. The communication schema may then be loaded into the CVM system where it is instantiated, synthesized, and executed by a fully automated process (described below), to satisfy the user communication needs 250. It should be noted that the communication schema may be defined independent of device types and underlying network configuration. Network users may then use the application defined by the schema 260.

Figure 3:
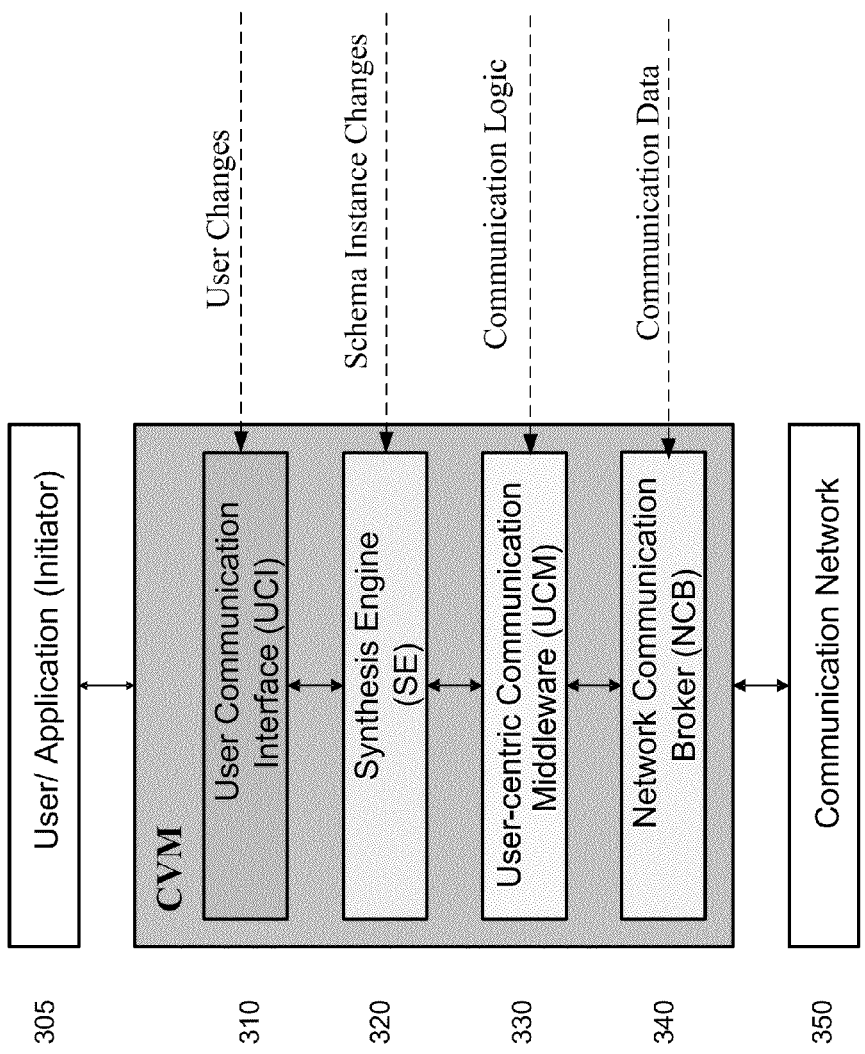
FIG. 3 illustrates details of a communication virtual machine system of FIG. 2.

FIG. 3 illustrates that the CVM system may generally include a user communication interface (UCI) 310, a synthesis engine (SE) 320, user-centric communication middleware (UCM) 330, and a network communication broker (NCB) 340. The UCI 310 may provide a language environment for users 305 to specify their communication requirements. The synthesis engine (SE) 320 may be a set of algorithms to automatically synthesize a user communication model to an executable form. The UCM 330 may be used to execute the communication model generated by the synthesis engine and may coordinate the delivery of communication services to users, independent of the underlying network configuration. The network communication broker 340 may provide a network-independent application program interface (API) to the UCM and works with the underlying communication network (e.g., systems and protocols) 350 to deliver a communication application.

Figure 4:
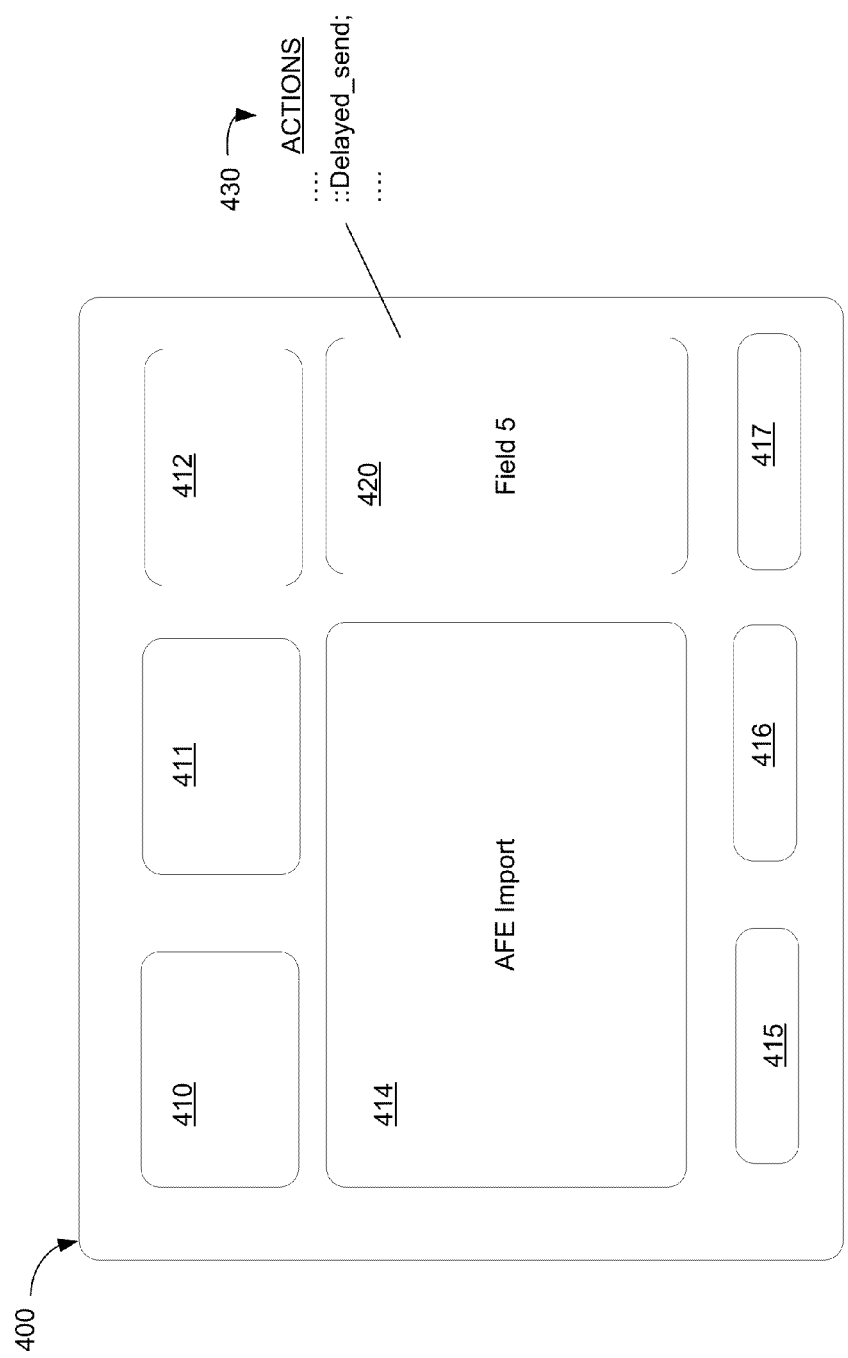
FIG. 4 illustrates active multimedia forms.

To allow for exchange and sharing among participants of a communication design session, the CVM system provides active multimedia form exchange (AFE) that uses rich multimedia structured data. As illustrated in FIG. 4, AFE includes pre-defined metadata forms 400 that may be used, in part, to capture schema definitions. AFE may be different from other passive data forms, e.g., a form defined in a Microsoft Word document, because AFE may provide not only structured representation of data in communication, but also instructions on how the data will be processed. For example, the AFE forms may contain elements 410-420, or fields, which by can be another AFE (e.g., field 414) or can be associated with commands or actions 430 for individualized processing and manipulation. FIG. 4 illustrates that an AFE element may be marked for "delayed_send," 430, which will delay transmission of the associated data until it is specifically requested. An AFE element may also be associated with special security requirements such as password and login requirements. When another AFE is associated with a field, on-the-fly structured bundling of multimedia data may be accomplished by channeling the dynamic data received into a structured format that is defined, for example, by the field parameters. The action-oriented features are systematically supported by the CVM modeling language. Examples of AFE content include a page of patient medical records, a loan application, a student record, an insurance claim, or a structured collection of multimedia files.

Figure 5:
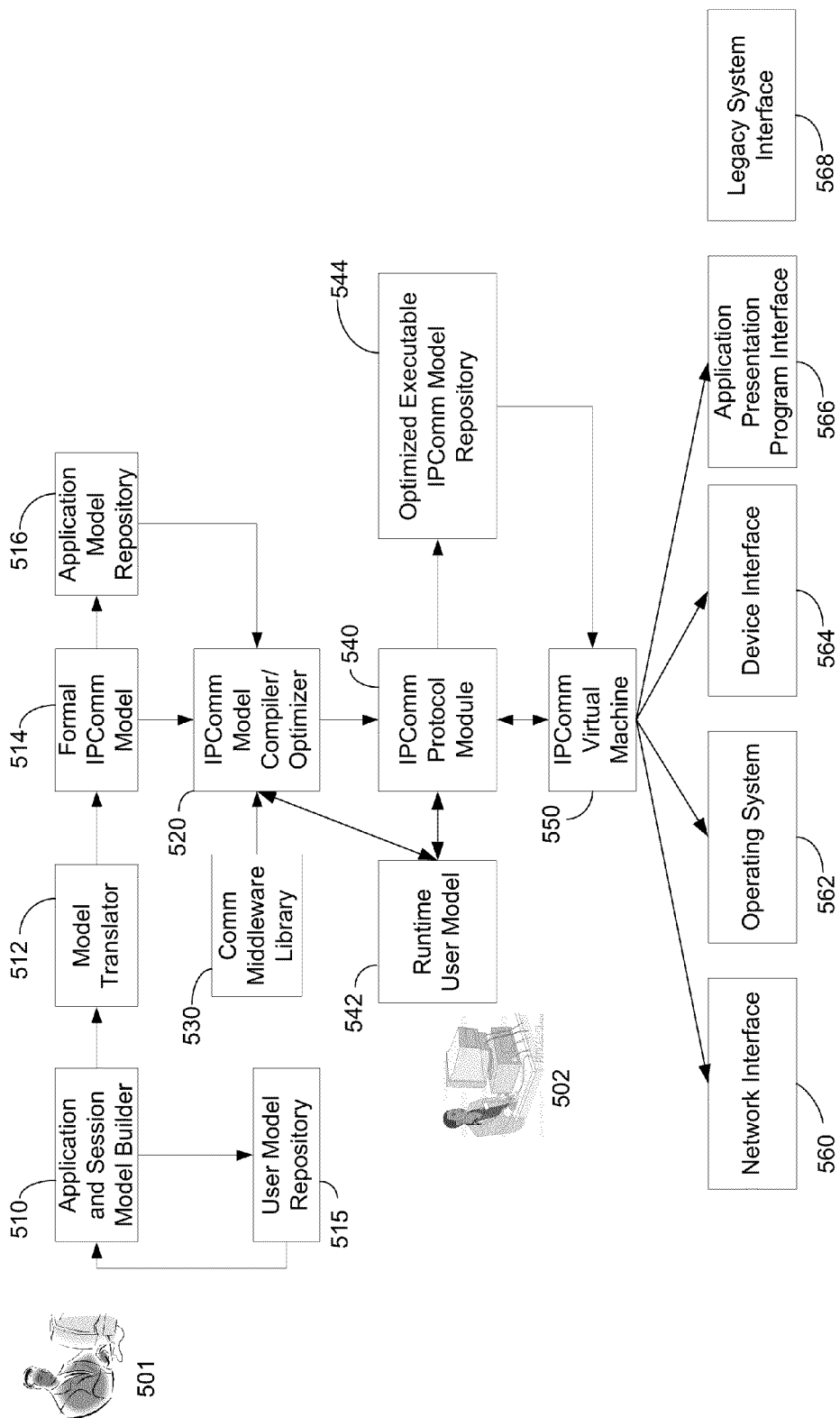
FIG. 5 illustrates communication virtual machine system objects that may be used to provide the application development platform described.

FIG. 5 illustrates the CVM objects that may be used to provide the application development platform described. A designer may interact with model builder 510 to create AFE forms. Pre-defined forms may be provided to the model builder and accessible to a user via a user model repository. For example, the model builder may provide a graphical user interface in which the user displays design forms for customization from the model repository. The model created using the model builder may then be translated into an intermediary script, using a model translator 512, which may then be sent to other objects for processing. In this embodiment, the intermediary script may be a CVM model (IPComm Model) 514. The CVM model may be saved to a repository 516. The CVM model may then be compiled for execution by a CVM compiler 520. The compiler 520 may use a communication middleware library 530 (Comm Middleware), to provide the necessary interfaces required to implement the model on a target communication protocol, e.g., TCP/IP, etc, and/or operating platform, e.g., Microsoft Windows NT. The result of the compilation may be an executable that may be managed by a CVM Protocol Module 540. The Protocol Module 540 may be used to coordinate CVM communications over the underlying, pre-existent, communication infrastructure. For example, if the CVM application (defined from a model created using the model builder) is to be run on an existing network comprising TCP/IP and Microsoft NT operating systems, then the Protocol Module 540 may configure an interface for marshalling the application data over the underlying NT system and over the TCP/IP protocol. The Protocol Module 540 may be designed to provide this translation and management automatically after it downloads a configured interface to, for example, a device on the existing network (e.g., using device interface 564). The Protocol Module 540 may be used to interface the data communication provided between the CVM system components with different parts of the underlying network (e.g., different machines). The Virtual Machine 550, may be used to execute the general functions of the model defined using the model builder. In one embodiment, the Protocol Module 540 and Virtual Machine 550 may be encapsulated together.

In one embodiment, the executable produced by the compiler 520, may be optimized by the Protocol Module 540 to further adapt the executable for execution on the target system. The optimized code may be further saved to an optimized executable repository 544. A test user may observe and review the execution of the code compiled by the compiler at a workstation 510 that is coupled to the optimizer 520 and CVM Protocol module 540. The user may then modify the model for re-compiling at the compiler 520, and then repeat the review process.

FIG. 5 further illustrates that the Virtual Machine 550, together with the CVM Protocol Module 540, may manage communications between the CVM system and underlying network interfaces 560, operating systems 562, and device interfaces 564, as well as provides graphical user interfaces 566 based on the application model created. Another interface that the CVM system may provide is a legacy system interface. In the situation in which the underlying network provides access to older, legacy systems, (e.g., mainframe systems), the CVM system may provide an interface 568 or adaptor to interact with the legacy system in addition to the other interfaces with other parts of the underlying network.

Figure 6:
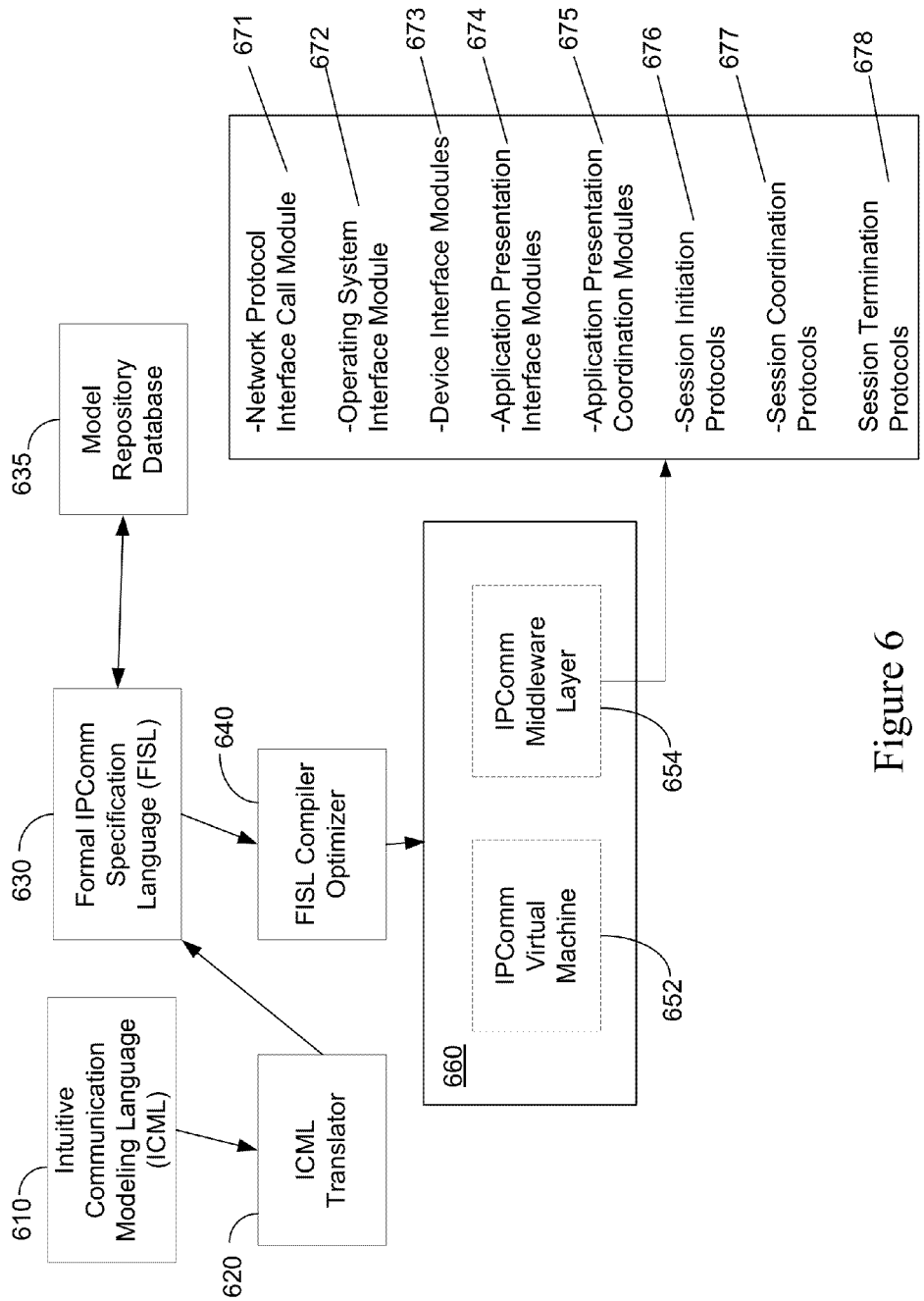
FIG. 6 illustrates a code translation process embodiment.

FIG. 6 illustrates the code translation process in the CVM system. The model builder 510 may allow the user to define the model using an intuitive Communication Modeling Language (CML) 610. In one embodiment, the model builder may use a graphical user interface that allows the user to produce CML code 610 by manipulating code analogous graphical objects. In another embodiment, the CML 610 may be an intermediary code generated from the manipulation of graphical objects displayed to the user. The CML 610 may be a higher level language that a user may easily use to define the requirements of the communication application. The model translator 512 of FIG. 5, may serve to translate 620 the CML code into Formal CVM Specification Language (FCSL) 630 that may be compiled using compiler 640, 520. The FCSL code 630 may be stored in a repository 635. FIG. 6 further illustrates an embodiment in which a Virtual Machine 652 may be coupled to a CVM Middleware layer 654 that together provides an execution platform 660 over an existing network system to implement the model defined communication application.

FIG. 6 further illustrates that the CVM Middleware 654 components may provide modules 670 that are used to interface various aspects of the model to a target system and target protocol. The components may include, for example, network protocol interface call modules 671, operating system interface modules 672, a device interface modules 673, application presentation interface modules 674, and application presentation coordination modules 675. The middleware components may also include protocols used by the CVM system to communicate between the components the CVM creates and provides interoperability over an existing system and protocols. These protocols may include session initiation protocols 676, Session Coordination Protocols 677, and session termination protocols 678.

The described CVM system may be used in a number of different applications. For example, in healthcare, CVM may be used to enable physicians to communicate patient status and record in an easy, convenient, and timely fashion while adhering to HIPPA requirements (e.g. in healthcare organizations, the forms may be medical records for communication exchange between doctors or between doctor and patients, where sophisticated communication requirements are needed). In the telecom industry, CVM may be used to provide a communication services platform for service providers to deliver new communications and data sharing capabilities to their subscribers.

CVM may be used in military applications to provide a platform for secure communications applications to meet changing battlefield communication/information requirements. CVM may be used in financial applications to enhance communications of financial transactions/documents and support business processes. Also, in disaster management applications, CVM may be used to enable organizations to communicate and exchange information ad-hoc during disaster mitigation efforts with minimal technical effort.

Moreover, the CVM client software may be deployed via the Internet and may be used by the public as a general communication tool. CVM may be deployed within an organization or enterprise as a general communication/data sharing tool. CVM may be deployed within an industry sector for domain specific communication applications.

Figure 7:
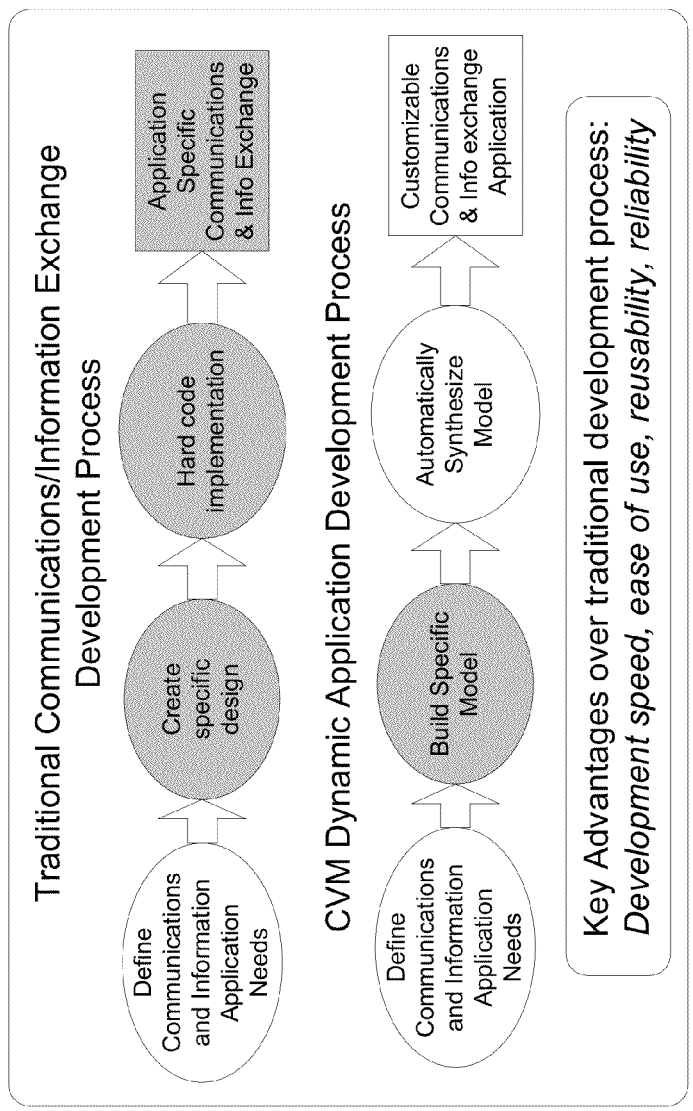
FIG. 7 illustrates differences in work flow between existing systems and the described communication virtual machine system.

FIG. 7 illustrates a difference in work between operation of existing systems and the above described CVM system. The shaded areas of FIG. 7 illustrate the work required by a designer to create a new application. In the existing application development technology, a new communication application may need to be designed and then hard coded to provide a non-modifiable, target specific application that may require months or years of system development, testing, deployment and integration efforts (and associated cost and delay). Using the CVM system, the primary task for supporting a new type of communication application amounts to building one or more communication schemas, which can be done in a matter of minutes, hours, or at most days, without the need of new system development. Moreover, the schemas can be changed on-the-fly to accommodate changing needs of the users or applications, while customized communication system, once deployed, will be far more difficult and expensive to change.

What is claimed is:

1. A method of constructing digital communications comprising:
   developing a schema defined in a communication modeling language and representing user supplied requirements and a session request;
   loading the schema into a communication virtual process, the communication virtual process:
      (i) storing an intermediary script; and
      (ii) compiling the intermediary script based upon information stored in a middleware library so that the intermediary script is compiled into an executable object, wherein the middleware library includes interfaces and the implementation of the intermediary script for use with the target module;
   managing the executable object between a source module and a target module based on an existing communications architecture between the source module and the target module, wherein the managing includes retrieving an interface module to marshal data over the existing communications architecture and referencing the target module for that interface module;
   coordinating communications based on the existing communications architecture; and
   optimizing the executable object to further adapt to the executable object for execution on the target module.

2. A method as defined in claim 1, further comprising:
   creating the interface module to marshal data over the existing communications architecture.

3. A method as defined in claim 1, wherein the schema is configured for editing during runtime.

4. A method as defined in 1, wherein the schema is configured for editing based on changing from voice conference to video conference.

5. A method as defined in claim 1, wherein the schema is configured for editing based on changing data type to be sent from source module to target module.

6. A method as defined in claim 1, further comprising:
   synthesizing the schema into a communication script configured to be executed by the target module.

7. A method as defined in claim 6, further comprising:
   prompting a user for the schema.

8. A method as defined in claim 6, further comprising:
   updating the script to interoperate with an updated existing network architecture.

9. A method of constructing digital communications comprising:
   developing a communication schema defined in a communication modeling language and representing user requirements;
   loading the communications schema into a communication virtual process based on a session request, the communication virtual process:
      storing the communications schema; and
      synthesizing the communications schema into a communication script configured to be executed on a destination communication module, the synthesizing includes configuring the communication script to interoperate with an existing network architecture and one or more existing modules coupled between a source communication module and the destination communication module;
   compiling the communications script based on information stored in a middleware library so that the communications script is compiled into an executable object, wherein the middleware library includes interfaces and the implementation of the communication script for use with the destination communication module; and
   retrieving an interface module to marshal data over the existing network architecture and referencing the destination communication module for that interface module.

10. A method as defined in claim 9, wherein the communication script is configured to be executed by the destination communication module, based on information stored in a library including interface modules configured to implement the communications script for use with the destination module.

11. A method as defined in claim 9, wherein the communication schema is configured for editing during runtime.

\* \* \* \* \*